(12) United States Patent
Wakaki et al.

(10) Patent No.: US 10,360,903 B2
(45) Date of Patent: Jul. 23, 2019

(54) SPOKEN LANGUAGE UNDERSTANDING APPARATUS, METHOD, AND PROGRAM

(71) Applicant: KABUSHIKI KAISHA TOSHIBA, Minato-ku, Tokyo (JP)

(72) Inventors: Hiromi Wakaki, Tokyo (JP); Kenji Iwata, Tokyo (JP); Masayuki Okamoto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 15/433,316

(22) Filed: Feb. 15, 2017

(65) Prior Publication Data
US 2017/0162190 A1 Jun. 8, 2017

Related U.S. Application Data

(63) Continuation of application No. PCT/JP2015/058565, filed on Mar. 20, 2015.

(51) Int. Cl.
*G10L 15/18* (2013.01)
*G06F 17/27* (2006.01)
(Continued)

(52) U.S. Cl.
CPC ...... *G10L 15/1815* (2013.01); *G06F 17/2785* (2013.01); *G10L 13/00* (2013.01);
(Continued)

(58) Field of Classification Search
CPC . G10L 15/22; G10L 15/1815; G10L 15/1822; G10L 17/2785; G06F 17/2755
(Continued)

(56) References Cited

U.S. PATENT DOCUMENTS

2001/0041977 A1 11/2001 Aoyagi et al.
2002/0198714 A1* 12/2002 Zhou ................... G10L 15/1822
704/252
(Continued)

FOREIGN PATENT DOCUMENTS

JP 2000-020520 A 1/2000
JP 2001-209662 A 8/2001
(Continued)

OTHER PUBLICATIONS

International Search Report dated Jun. 2, 2015 in PCT Application No. PCT/JP2015/058565, 2 pgs.

*Primary Examiner* — Lamont M Spooner
*Assistant Examiner* — Oluwadamilola M Ogunbiyi
(74) *Attorney, Agent, or Firm* — Knobbe, Martens, Olson & Bear LLP (57) ABSTRACT

According to one embodiment, an apparatus includes a storage unit, a first acquisition unit, a second acquisition unit, an analyzer, and a recognition unit. The storage unit stores first situation information about a situation assumed in advance, a first representation representing a meaning of a sentence assumed, intention information representing an intention to be estimated, and a first value representing a degree of application of the first representation to the first situation information and the intention information. The first acquisition unit acquires a natural sentence. The second acquisition unit acquires second situation information about a situation when acquiring the natural sentence. The analyzer analyzes the natural sentence and generates a second representation representing a meaning of the natural sentence. The recognition unit obtains an estimated value based on the first value associated with the first situation information and the first representation.

18 Claims, 8 Drawing Sheets

(51) Int. Cl.
*G10L 13/00* (2006.01)
*G10L 15/22* (2006.01)
*G10L 13/10* (2013.01)

(52) U.S. Cl.
CPC .............. *G10L 13/10* (2013.01); *G10L 15/22* (2013.01); *G06F 17/279* (2013.01); *G06F 17/2755* (2013.01); *G10L 15/1822* (2013.01); *G10L 2015/225* (2013.01); *G10L 2015/226* (2013.01); *G10L 2015/228* (2013.01)

(58) Field of Classification Search
USPC .................................................. 704/9, 257
See application file for complete search history.

(56) References Cited

U.S. PATENT DOCUMENTS

| | | | | |
|---|---|---|---|---|
| 2006/0122834 | A1* | 6/2006 | Bennett | G10L 15/1822 704/256 |
| 2006/0178882 | A1* | 8/2006 | Braho | G10L 15/08 704/240 |
| 2010/0121864 | A1* | 5/2010 | Stuhec | G06F 17/30607 707/758 |
| 2010/0198592 | A1* | 8/2010 | Potter | G10L 15/1822 704/233 |
| 2010/0274892 | A1* | 10/2010 | Legrand | H04L 63/1408 709/224 |
| 2012/0016678 | A1* | 1/2012 | Gruber | G06F 17/3087 704/275 |
| 2012/0239383 | A1* | 9/2012 | Bangalore | G10L 15/1822 704/9 |
| 2012/0330869 | A1* | 12/2012 | Durham | G06N 5/022 706/16 |
| 2013/0006616 | A1 | 1/2013 | Wakaki et al. | |
| 2013/0041652 | A1* | 2/2013 | Zuev | G06F 17/2755 704/8 |
| 2013/0110505 | A1* | 5/2013 | Gruber | G06F 17/3087 704/9 |
| 2013/0110518 | A1* | 5/2013 | Gruber | G06F 17/3087 704/275 |
| 2013/0117020 | A1 | 5/2013 | Chung et al. | |
| 2013/0246050 | A1* | 9/2013 | Yu | G10L 15/1822 704/9 |
| 2013/0325468 | A1* | 12/2013 | Lee | G09B 19/04 704/238 |
| 2014/0229405 | A1* | 8/2014 | Govrin | G06Q 40/02 706/11 |
| 2015/0149177 | A1* | 5/2015 | Kalns | G10L 15/1822 704/257 |
| 2015/0149182 | A1* | 5/2015 | Kalns | G10L 15/18 704/275 |
| 2015/0348549 | A1* | 12/2015 | Giuli | G06F 16/3329 704/235 |
| 2016/0124908 | A1* | 5/2016 | Cecchi | G06F 17/2785 704/9 |
| 2016/0171979 | A1* | 6/2016 | Breazeal | B25J 9/0003 704/9 |
| 2016/0259779 | A1* | 9/2016 | Labsk | G10L 15/18 |
| 2017/0206064 | A1* | 7/2017 | Breazeal | H04N 13/239 |

FOREIGN PATENT DOCUMENTS

| | | |
|---|---|---|
| JP | 2005-149329 A | 6/2005 |
| JP | 2006-503328 A | 1/2006 |
| JP | 2006-163631 A | 6/2006 |
| JP | 2006-317573 A | 11/2006 |
| JP | 2007-148118 A | 6/2007 |
| JP | 2010-034695 A | 2/2010 |
| JP | 2013-073355 A | 4/2013 |
| JP | 5537569 B2 | 7/2014 |
| WO | WO 2004/036887 A1 | 4/2004 |

\* cited by examiner

| Intention ID | Situation ID | Meaning representation | Value |
|---|---|---|---|
| I1 | (S1&S2&S3) | オン(Ga-case:φ, Wo-case:エアコン, Ni-case:φ) | 0.09 |
| I1 | (S1&S2&S3) | 暑い(Ga-case:φ, Wo-case:φ, Ni-case:φ) | 0.08 |
| I1 | (S1&S2&S3) | つける(Ga-case:φ, Wo-case:冷房, Ni-case:φ) | 0.18 |
| I2 | (S1&S2&S3) | 停止する(Ga-case:φ, Wo-case:エアコン, Ni-case:φ) | 0.13 |
| I2 | (S1&S2&S3) | 寒い(Ga-case:φ, Wo-case:φ, Ni-case:φ) | 0.0001 |
| I2 | (S1&S2&S3) | 止める(Ga-case:φ, Wo-case:冷房, Ni-case:φ) | 0.21 |
| I1 | (S1&S3) | オン(Ga-case:φ, Wo-case:エアコン, Ni-case:φ) | 0.09 |
| I1 | (S1&S3) | 暑い(Ga-case:φ, Wo-case:φ, Ni-case:φ) | 0.0001 |
| I1 | (S1&S3) | つける(Ga-case:φ, Wo-case:冷房, Ni-case:φ) | 0.18 |
| I2 | (S1&S3) | 停止する(Ga-case:φ, Wo-case:エアコン, Ni-case:φ) | 0.12 |
| I2 | (S1&S3) | 寒い(Ga-case:φ, Wo-case:φ, Ni-case:φ) | 0.06 |
| I2 | (S1&S3) | 止める(Ga-case:φ, Wo-case:冷房, Ni-case:φ) | 0.21 |
| … | … | … | … |

オン(utterance : on : meaning : switch on), エアコン(eakon : air conditioner), 暑い(atui : hot), つける(tukeru : switch on)
冷房(reibou : air conditioner), 停止する(teishi suru : switch off), 寒い(samui : feel cold), 止める(tomeru : switch off)

| Speech act tag | Contents of act |
|---|---|
| Greeting | Opening/closing speech of dialog |
| Acknowledgment/apology | Ritualistic speech such as thanks or apology |
| Assent | Reply to urge partner to utter |
| Reply | Reply that is impossible without preceding dialog |
| Question | Put question to partner (YN, WH) |
| Proposal | Make proposal to partner |
| Information transmission | Transmit information to partner |
| Request | Request partner |
| ⋮ | ⋮ |

FIG. 6

$$P(\vec{S}) = \begin{pmatrix} S_1 \\ S_2 \\ S_3 \\ S_4 \\ S_5 \\ S_6 \\ S_7 \\ \vdots \end{pmatrix} = \begin{pmatrix} \text{TV application?} \\ \text{TV on?} \\ \text{Search screen of TV?} \\ \text{Program displayed on TV?} \\ \text{Window open?} \\ \text{Heating on?} \\ \text{Pain in stomach?} \\ \vdots \end{pmatrix} = \begin{pmatrix} 0.9999 \\ 0.9999 \\ 0.0001 \\ 0.9999 \\ 0.01 \\ 0.9 \\ 0.001 \\ \vdots \end{pmatrix}$$

SPOKEN LANGUAGE UNDERSTANDING APPARATUS, METHOD, AND PROGRAM

CROSS-REFERENCE TO RELATED APPLICATIONS

This application is a Continuation Application of PCT Application. No. PCT/JP2015/058565, filed Mar. 20, 2015, the entire contents of which are incorporated herein by reference.

FIELD

Embodiments described herein relate generally to a spoken language understanding apparatus, method, and program.

BACKGROUND

In recent years, various dialog systems exist. As the processing of a dialog system, generally, an utterance is recognized by performing language analysis of a user utterance, and a dialog is controlled using the result of the utterance recognition. However, since the representation of the user utterance may change in accordance with the situation, it may be impossible to know the intention of the utterance only by the language analysis. Hence, the intention of the utterance needs to be estimated in consideration of the situation of the utterance.

As a related art, there is a method of making a selection from intention candidates as the recognition results of commands that are specific utterances as user utterances based on environmental information (position information, traffic situation, road surface state, and the like) around an information terminal. If the recognition rate of the command recognition results is low, the intention is estimated only from the environmental information. If the recognition rate of the command recognition results is sufficient, the intention is estimated from the environmental information and the command recognition results.

DETAILED DESCRIPTION

In the above-described related art, however, only a command recognition result is assumed as a user utterance. Hence, since the variations of user utterances are limited, a probability table of conditional probability P (intention|utterance, situation) concerning user's intentions can be prepared in advance. However, if natural sentence that is a spoken language is assumed as a user utterance, the variations, of natural sentences are enormous, and the above-described probability table cannot be prepared. As a result, a user's intention to be estimated cannot be limited in the range of intentions assumed by the system. It is therefore impossible to recognize a user utterance.

The present embodiments have been made to solve the above-described problem, and have as its object to provide a spoken language understanding apparatus capable of recognizing the intention of a user's free utterance, a method, and a program.

A spoken language understanding apparatus, method, and program according to the embodiments will now be described in detail with reference to the accompanying drawings. Note that in the following embodiments, parts denoted by the same reference numerals are assumed to perform the same operations, and a repetitive description will appropriately be omitted.

According to an embodiment, a spoken language understanding apparatus includes a first storage unit, a first acquisition unit, a second acquisition unit, a first analyzer, and a recognition unit. The first storage unit stores first situation information about a situation assumed in advance, a first semantic representation representing a meaning of a sentence assumed as an input from a user, intention information representing an intention to be estimated, and a first value representing a degree of application of the first semantic representation to the first situation information and the intention information in association with each other. The first acquisition unit acquires a natural sentence. The second acquisition unit acquires second situation information about a situation when acquiring the natural sentence. The first analyzer analyzes the natural sentence and generates a second semantic representation representing a meaning of the natural sentence. The recognition unit obtains, from the first storage unit, an estimated value based on the first value associated with the first situation information. and the first semantic representation corresponding to the second situation information and the second semantic representation.

(First Embodiment)

Figure 1:
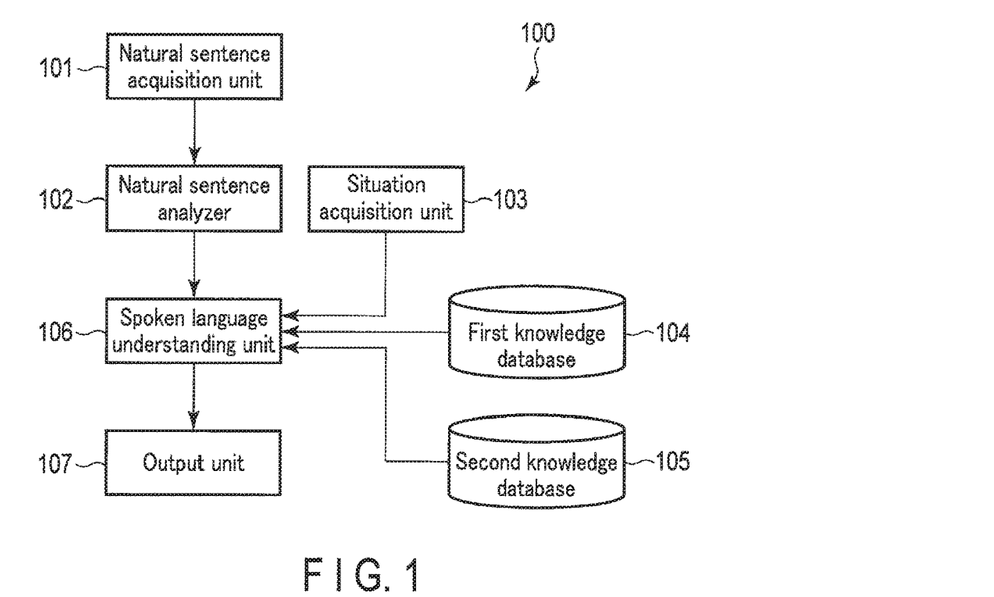
FIG. 1 is a block diagram showing a spoken language understanding apparatus according to the first embodiment.

A spoken language understanding apparatus according to the first embodiment will be described with reference to the block diagram of FIG. 1.

A spoken language understanding apparatus 100 according to the first embodiment includes a natural sentence acquisition unit 101 (also called a first acquisition unit), a natural sentence analyzer 102 (also called a first analyzer), a situation acquisition unit 103 (also called a second acquisition unit), a first knowledge database 104 (also called a first storage unit), a second knowledge database 105 (also called a second storage unit), a spoken language understanding unit 106, and an output unit 107.

The natural sentence acquisition unit 101 acquires a natural sentence. The natural sentence is a character string of a so-called spoken language, and is assumed to be a sentence obtained from a user's free utterance. Note that not only a natural sentence but also any sentence can be processed in the same way.

The natural sentence analyzer 102 receives the natural sentence from the natural sentence acquisition unit 101, and analyzes the natural sentence, thereby generating a semantic representation (also called a second semantic representation). The semantic representation is a form representing the meaning of the natural sentence. Note that the natural sentence analyzer 102 may generate a plurality of semantic representations in accordance with the contents of the natural sentence.

The situation acquisition unit 103 acquires situation information (also called second situation information) concerning a situation in acquiring the natural sentence. As the situation information, for example, a value measured by a temperature sensor or a humidity sensor or a dialog history with the user is used.

The first knowledge database 104 stores situation information (also called first situation information), intention information, a semantic representation (also called a first semantic representation), and a value (also called a first value) representing the degree of application of the semantic representation to the situation information and the intention information in advance in association with each other. The first situation information stored in the first knowledge database 104 is information concerning a situation assumed in advance. The first semantic representation represents the meaning of a sentence assumed as an input from the user. The intention information is information representing an intention to be estimated and is set in the system in advance. Details of the first knowledge database 104 will be described later with reference to FIGS. 3A, 3B, and 3C.

The second knowledge database 105 stores first situation information, intention information, and a value (also called a second value) representing the degree of application of the intention information to the first situation information in advance in association with each other. Details of the second knowledge database 105 will be described later with reference to FIG. 4.

The spoken language understanding unit 106 receives the second semantic representation from the natural sentence analyzer 102 and the second situation information from the situation acquisition unit 103. The spoken language understanding unit 106 obtains an estimated value from the first knowledge database 104 based on a first value corresponding to first situation information and first semantic representation corresponding to the second situation information and the second semantic representation. The spoken language understanding unit 106 also obtains intention information corresponding to the estimated value as estimated intention information.

Note that the spoken language understanding unit 106 may obtain a second value representing the applicability of the intention information to the second situation information from the second knowledge database 105 and obtain the estimated value using the first value and the second value.

The output unit 107 receives the estimated value and the estimated intention information from the spoken language understanding unit 106, and outputs the estimated value and the estimated intention information to the outside.

Semantic analysis processing of the natural sentence analyzer 102 will be described next with reference to the flowchart of FIG. 2.

Figure 2:
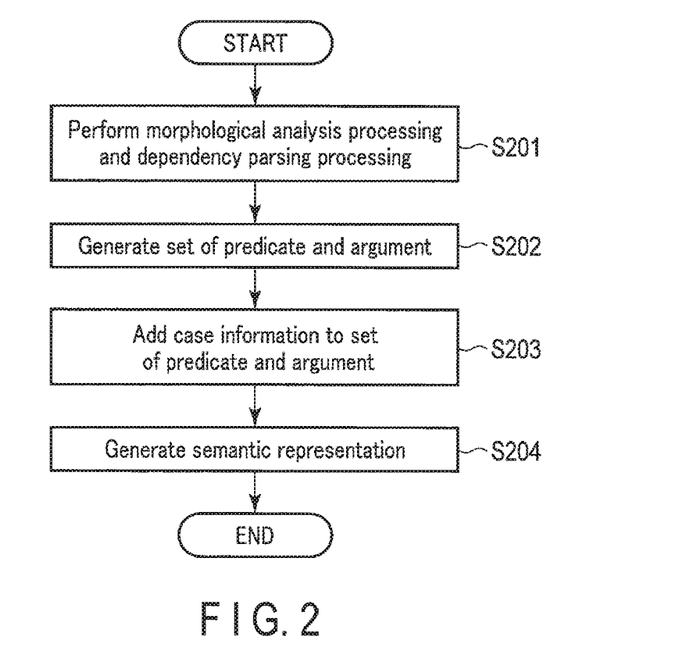
FIG. 2 is a flowchart showing semantic analysis processing of a natural sentence analyzer.

A semantic representation generated in FIG. 2 is assumed to be generated based on a predicate argument structure that is a form taking one or more arguments with respect to one predicate. However, a semantic representation may be generated based on a pair of a noun and a verb. That is, any method is usable as long as it can extract the meaning of a natural sentence.

In step S201, the natural sentence analyzer 102 performs morphological analysis processing and dependency parsing processing for a natural sentence received from the natural sentence acquisition unit 101. The natural sentence analyzer 102 obtains a word segmentation result and the parts of speech of words as the result of the morphological analysis processing, and obtains a word dependency relationship as the result of the dependency parsing processing.

In step S202, the natural sentence analyzer 102 generates a set of a predicate and an argument based on the word segmentation result, the parts of speech, and the dependency relationship. The predicate may be a conjugative word such as a verb, an adjective or an adjective verb, or may be an event noun (for example, a verbal noun). Basically, an argument is a noun. However, it may be a word other than nouns if it is an element necessary as a modifier for a verb. Note that only a predicate may be generated while omitting an argument, and vice versa.

In step S203, the natural sentence analyzer 102 estimates a case that matches the semantic contents of the set of the predicate and the argument, and adds case information. As a method of estimating a case, for example, a case that matches the semantic contents of a current set is estimated in consideration of the original particle connected to the predicate in the original natural sentence, the peripheral information of the predicate, a particle concerning another set of a predicate and an argument, and the like. A general estimation method is used.

The case added to the set of the predicate and the argument can be either a surface case or a deep case.

A surface case is a case determined superficially. In Japanese, when estimating a case, a surface case is often estimated. Examples of the surface case are ga-case (nominative case), wo-case (accusative case), ni-case (dative case), kara-case, he-case, to-case, yori-case, made-case, and de-case. These cases are added as case information to the sets of predicates and arguments. More specifically, if there is a word segmentation result "エアコン/を/停止/して" (utterance; eakon/wo/teishi/shite; meaning; please switch off air conditioner), "wo-case" is added as case information to the set of the predicate "停止する" (teishi suru: switch off) and the argument "エアコン" (eakon: air conditioner). Note that in English, nominative case, genitive case (possessive case), and accusative case (objective case) may be used as the surface cases.

A deep case is a case representing a meaning common to all languages. Examples of the deep case are agent, experiencer, instrument, object, source, goal, location, and time. In a language other than Japanese, for example, in English, semantic role labeling for adding a deep case to a set of a predicate and an argument is often performed.

Note that in the process of step S203, generation of a set of a predicate and an argument and case estimation may be done using information such as a case frame dictionary, appearance frequency information in a large-scale corpus, a word cluster, and a named entity dictionary.

If a word corresponding to each case does not exist, the information may be blank. Alternatively, a word according to a situation, which is not included in the natural sentence, may be applied as the case information.

In step S204, the natural sentence analyzer 102 arranges the processing result of step S203 by, for example, deleting redundant information, and generates a semantic representation. Note that for a semantic representation in which one of an argument and a predicate is omitted, the omitted information may be compensated for by referring to data such as situation information, a case frame dictionary, appearance frequency information in a large-scale corpus, a word cluster, and a named entity dictionary. The analysis processing of the natural sentence analyzer 102 thus ends.

A detailed example of the semantic representation generated by the natural sentence analyzer 102 will be described next.

The semantic representation generated based on the predicate argument structure has, for example, a form "predicate (case information: argument)". More specifically, when predicate argument structure analysis is performed for the above-described word segmentation result "エアコン/を/停止/して" (eakon/wo/teishi/shite: please switch off air conditioner), the predicate "停止する" (teishi suru: switch off) and the argument "wo-case: エアコン" (eakon: air conditioner or HVAC (heating, ventilation, and air-conditioning) equipment) can be obtained. Hence, a semantic representation "停止する (wo-case: エアコン)" is generated.

A semantic representation generated based on a pair of a noun and a verb has, for example, a form "verb (noun)". More specifically, a semantic representation "停止する (エアコン)" is generated for the word segmentation result "エアコン/を/停止/して". Note that in the semantic representation, the verb may have a bare verb form "停止する", or may have the style in the original natural sentence "停止して" (teishi shite: switch off). As for the noun, if there are a plurality of nouns modifying the verb, they may be written together in parentheses.

A tag or word representing a tense, aspect, voice, modality, polarity, frequency, or degree may further be added to the semantic representation as supplementary information to the meaning of a predicate (including an event noun or an eventive noun) in a semantic representation generated based on the predicate argument structure, or as supplementary information to the meaning of a verb in a semantic representation generated based on a Pair of a noun and a verb.

Tense is a form of verb, for example "turn off" become "turned off" in the past tense. Aspect is the characteristic of a verb that expresses the way an action happen, for instance, perfect or continuous. The aspect of "standing" in "I was standing near the window" is different from "stand" in "I can stand without a ratchet. Voice is a verb form that shows whether the subject of a sentence does or receive the action of a verb. For example "I turned off the light" is in the active voice, and then the "The light was turned off" is in the passive voice. Modality widely handles degrees of fact such as conjectural and affirmative and attitudes of utterances such as question and request. Polarity represents negative or affirmative. Frequency represents sometimes, frequently, or the like. Degree represents a quantitative concept such as all or a few. A tag representing the above-described item to be added to a semantic representation is generated based on the combination of an auxiliary verb, an adverb, a tense representation, and the like.

Based on a focusing particle (a word representing a limitation such as "だけ" (dake: only) or "のみ" (nomi: only)), an adnominal, and the like, a tag or word may further be added to the semantic represent ion as supplementary information to the meaning of an argument in a semantic representation generated based on the predicate argument structure, supplementary information to the meaning of a noun in a semantic representation generated based on a pair of a noun and a verb.

As the semantic representation, a semantic representation using a concept class in place of a predicate or argument may be generated.

Details of the first knowledge database 104 will be described next with reference to FIGS. 3A, 3B, and 3C.

Figure 3A:
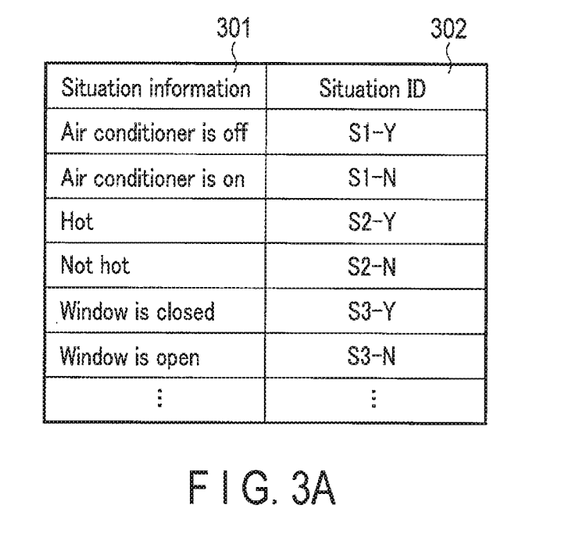
FIG. 3A is a view showing a table stored in a first knowledge database.

In a table shown in FIG. 3A, situation information 301 and a situation ID 302 corresponding the situation information 301 are stored in advance in association with each other. More specifically, the situation information 301 "冷房がついていない" (rei bou ga tuiteinai: air conditioner is off) and the situation ID 302 "S1-Y" are associated with each other. Note that an added symbol "Y" of the situation ID 302 represents application to the corresponding situation information 301, and an added symbol "N" represents non-application to the corresponding situation information 301.

Figure 3B:
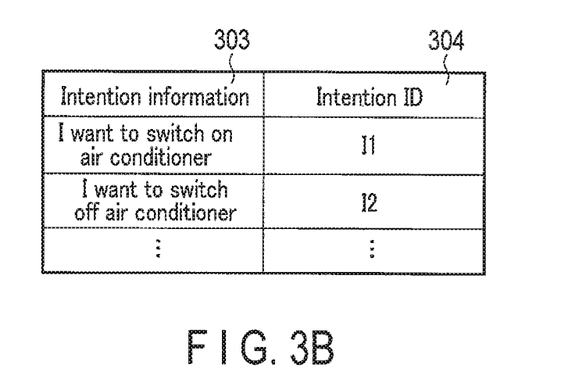
FIG. 3B is a view showing a table stored in a first knowledge database.

In a table shown in FIG. 3B, intention information 303 and an intention ID 304 corresponding to the intention information 303 are stored in advance in association with each other. More specifically, the intention information 303 "冷房をつけたい" (rei bou wo tuketai: I would like to switch on air conditioner) and the intention ID 304 "I1" are associated with each other.

Figure 3C:
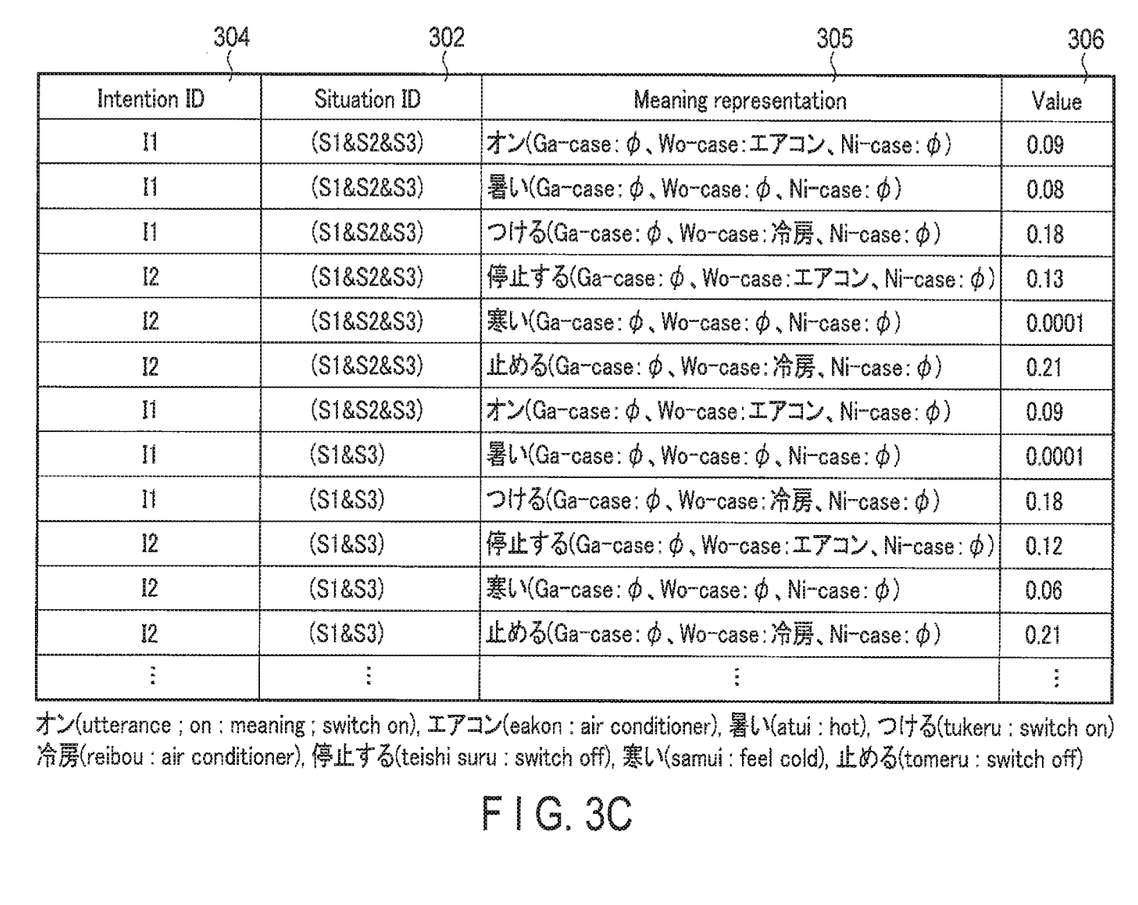
FIG. 3C is a view showing a table stored in a first knowledge database.

In a table shown in FIG. 3C, the intention ID 304, the situation ID 302, a semantic representation 305, and a value 306 are stored in advance in association with each other.

The semantic representation 305 is assumed to have the same form as the semantic representation generated by the natural sentence analyzer 102. Here, "ga-case", "wo-case", and "ni-case" are assumed as the case information. However, another case may be used as needed to interpret the meaning.

Note that as the semantic representation 305 shown in FIG. 3C, a representation from corresponding to the semantic representation generated by the natural sentence analyzer 102 that analyzes an input sentence is stored.

Here, the value 306 is the value of the conditional probability of the semantic representation 305 to the situation information 301 corresponding to the situation ID 302 and the intention information 303 corresponding to the intention ID 304. As the value 306, a value calculated in advance is used. Note that any value is usable as long as it is a value concerning a semantic presentation to intention information and situation information. Note that "φ" in the case information of a semantic representation indicates that applicable case information does not exist.

An argument that cannot be found may be specified by the symbol "φ" representing empty, as in a semantic representation "停止する (ga-case: φ, wo-case: エアコン)". For an argument represented by "φ" in the direct analysis result of a sentence, anaphoric analysis or context analysis may be performed to do compensation, and compensated information such as "あなた" (anata: you) or "システム" (shisutemu: system) may be embedded in the ga-case.

In the example of FIG. 3C, the intention ID 304 including two types "I1" and "I2" and the situation ID 302 including two types of combinations (S1, S2, S3) and (S1, S3) are combined, and the semantic representation 305 and the value 306 corresponding to the combination are associated. Note that for the sake of simplicity, the table shown in FIG. 3C stores information in a case in which the added symbol in the situation ID 302 is "Y". That is, in the table shown in FIG. 3C, a notation (S1 & S2 & S3) indicates (S1-Y & S2-Y & S3-Y).

A table stored in the second knowledge database 105 will be described next with reference to FIG. 4.

Figure 4:
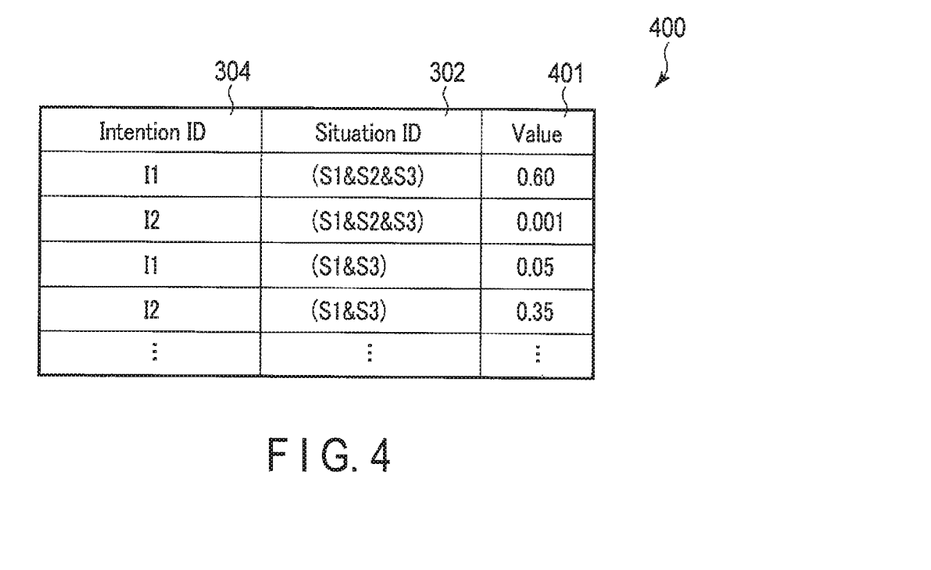
FIG. 4 is a view showing a table stored in a second knowledge database.

In a table 400 shown in FIG. 4, the intention ID 304, the situation ID 302, and a value 401 are stored in advance in association with each other. The value 401 is the value of the conditional probability of the intention information 303 corresponding to the intention ID 304 for the situation represented by the situation information 301 corresponding to the situation ID 302. As the value 401, a value calculated in advance is used. Note that any value is usable as long as it is a value concerning intention information to situation information.

For example, the intention ID 304 "I1", the situation ID 302 "(S1 & S2 & S3)", and the value 401 "0.60" are stored in association with each other.

Figure 5:
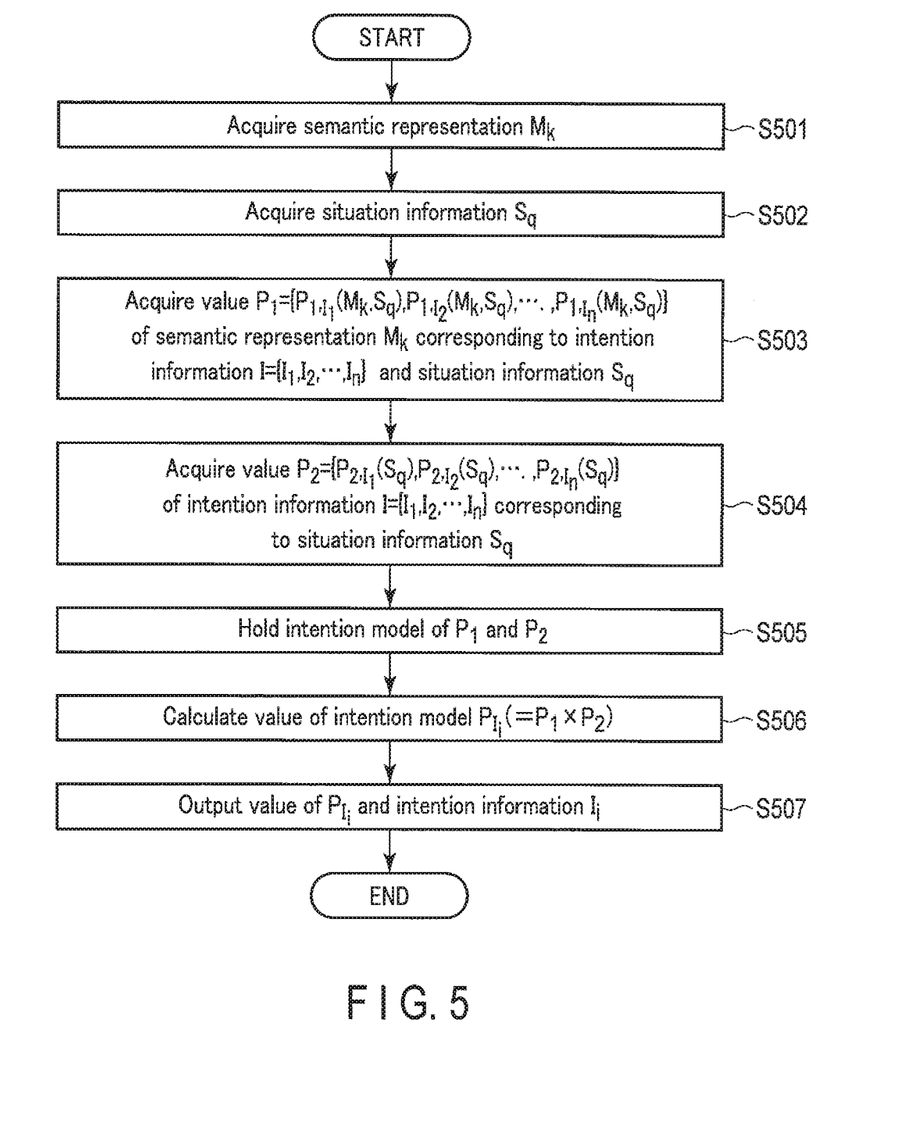
FIG. 5 is a flowchart showing processing of a spoken language understanding unit.

Processing of the spoken language understanding unit 106 will be described next with reference to the flowchart of FIG. 5.

In step S501, the spoken language understanding unit 106 acquires a semantic representation from the natural sentence analyzer 102. Here, a semantic representation $M_k$ is acquired, where k is a natural number.

In step S502, the spoken language understanding unit 106 acquires situation information from the situation acquisition unit 103. Here, situation information $S_q$ is acquired, where q is a natural number.

In step S503, the spoken language understanding unit 106 acquires a value $P_1$ (first value) of the semantic representation $M_k$ corresponding to intention information $I=\{I_1, I_2, \ldots, I_n\}$ and the situation information $S_q$ by looking up the first knowledge database 104. $P_1$ can be expressed as $$P_1 = \{P_{1, I_1}(M_k, S_q), P_{1, I_2}(M_k, S_q), \ldots, P_{1, I_n}(M_k, S_q)\} \quad (1)$$

In step S504, the spoken language understanding unit 106 acquires a value $P_2$ (second value) of the intention information $I=\{I_1, I_2, \ldots, I_n\}$ corresponding to the situation information $S_q$ by looking up the second knowledge database 105, $P_2$ can be expressed as $$P_2 = \{P_{2, I_1}(S_q), P_{2, I_2}(S_q), \ldots, P_{2, I_n}(S_q)\} \quad (2)$$

In step S505, the spoken language understanding unit 106 holds an intention model of $P_1$ and $P_2$.

In step S506, the spoken language understanding unit 106 calculates an intention model $P_{Ii}$. More specifically, using the Bayes' theorem or the like, the intention model $P_{Ii}$ is calculated from $P_1$ and $P_2$ as $$\operatorname{argmax}_{I_i} P(I_i \mid M_k, S_q) = \operatorname{argmax}_{I_i} \frac{P(M_k, I_i, S_q)}{P(M_k, S_q)} \quad (4)$$
$$= \operatorname{argmax}_{I_i} \frac{S_q}{S_q} \frac{P(M_k, I_i \mid S_q)}{P(M_k \mid S_q)} \propto$$
$$\operatorname{argmax}_{I_i} P(M_k, I_i \mid S_q)$$
$$= \operatorname{argmax}_{I_i} P_1(M_k \mid I_i, S_q) \times$$
$$P_2(I_i \mid S_q)$$

In step S507, the value (estimated value) of $P_{Ii}$ and intention information $I_i$ (estimated intention information) are output based on the calculation result in step S506. The processing of the spoken language understanding unit 106 thus ends.

Information to be obtained by the processing of the spoken language understanding unit 106 is the intention information $I_i$ that is likely when the situation information is the situation information $S_q$, and the semantic representation of a natural sentence input at this time is $M_k$. This information is the information obtained by equation (3). However, it is difficult to directly calculate equation (3). Hence, $P_1 \times P_2$ is calculated using equation (4), thereby estimating the likely intention information $I_i$.

Note that in step S507, a case in which the obtained set of the value (estimated value) of $P_{Ii}$ and the intention information $I_i$ (estimated intention information) is output is assumed. However, one piece of intention information $I_i$ obtained when $P_{Ii}$ is maximized may be output. Alternatively, a plurality of sets of intention information $I_i$ and $P_{Ii}$ may be output in the descending order of $P_{Ii}$.

If it is assumed that all intentions can occur in any situation, $P_2$ is assumed to be always constant, and equation (4) may be approximated to $$\operatorname{argmax}_{I_i} P_1(M_k \mid I_i, S_q) \quad (5)$$

If it is assumed that the value $P_1(M_k \mid I_i, S_q)$ is constant independently of the situation information $S_q$, the same value may be associated with the pieces of situation information $S_q$ in the second knowledge database 105. That is, the spoken language understanding unit 106 may perform the calculation using the intention model of only $P_1$ and acquire the value (estimated value) of $P_{Ii}$ and the intention information $I_i$ (estimated intention information).

The operation of the spoken language understanding apparatus 100 will be described next using a detailed example. Here, assume that intention information of the likeliest intention is output as estimated intention information.

Assume a case in which a natural sentence "冷房を停止して" (reibou wo teishi shite: please switch off air conditioner) is acquired from the user. Also assume that when acquiring the natural sentence, the situation acquisition unit 103 acquires, as situation information, information capable of determining that "air conditioner is on", "hot", and "window is closed".

The natural sentence acquisition unit 101 acquires the natural sentence "冷房を停止して".

The natural sentence analyzer 102 performs morphological analysis processing and dependency parsing processing for the natural sentence "冷房を停止して", and consequently generates a second semantic representation. "停止する (wo-case: 冷房)" (teishi suru: switch off) (reibou: air conditioner).

The spoken language understanding unit 106 looks up the first knowledge database 104, and acquires, as IDs corresponding to the second situation information, the situation IDs "S1-Y", "S2-Y", and "S3-Y" corresponding to "air conditioner is on", "hot", and "window is closed", respectively.

The spoken language understanding unit 106 acquires, as $P_1$, a value (first value) associated with the first situation information "(S1 & S2 & S3)" and the first semantic representation "停止する (ga-case: φ, wo-case: 冷房, ni-case: φ)" corresponding to the second situation information "S1-Y", "S2-Y", and "S3-Y" and the second semantic representation "停止する (wo-case: 冷房)" from the first knowledge database 104.

In the example of FIG. 3C, the spoken language understanding unit 106 acquires the value 306 "0.13" corresponding to the semantic representation 305 "停止する (ga-case: φ, wo-case: 冷房, ni-case: φ)", the intention ID 304 "I2", and the situation ID 302 "(S1 & S2 & S3)".

Next, the spoken language understanding unit 106 acquires, as $P_2$, a value (second value) corresponding to the intention information $I_n$ for the situation IDs "S1-Y", "S2-Y", and "S3-Y" from the second knowledge database 105.

In the example of FIG. 4, for the intention ID 304 "I1", the spoken language understanding unit 106 acquires the value 401 "0.60" corresponding to the situation ID 302 "(S1 & S2 & S3)". Additionally, for the intention ID 304 "I2", the spoken language understanding unit 106 acquires the value 401 "0.001" corresponding to the situation ID 302 "(S1 & S2 & S3)".

The spoken language understanding unit 106 performs a calculation for each of the intention IDs "I1" and "I2" based on equation (4). For the intention information I1, "0" is obtained because $P_1$ is 0. For the intention information I2, the value 401 "0.13×0.01=0.0013" is obtained for the situation ID 302 "(S1 & S2 & S3)".

Hence, the spoken language understanding unit 106 can obtain estimated intention information "I want to switch off air conditioner" corresponding to the estimated value "0.001" and the intention ID "$I_2$".

Note that when acquiring the value $P_1$, if the reading of the representation is similar to that of a representation registered in the first knowledge database 104, the similarity may be taken into consideration, instead of simply determining whether a matching semantic representation exists. For example, a value obtained by multiplying the value obtained as $P_1$ for the first time by a value α determined in advance may be obtained as a new value $P_1$.

More specifically, assume that if the natural sentence acquired by the natural sentence acquisition unit 101 is not "エアコンを止めて" (eakon wo tomete: please switch off air conditioner) but "アイコンを止めて" (aikon wo tomete: please switch off icon), the natural sentence analyzer 102 analyzes it as "止める (ga-case: φ, wo-case: アイコン, ni-case: φ)". The spoken language understanding unit 106 calculates the reading similarity between "エアコン" (eakon: air conditioner) registered in the first knowledge database 104 and "アイコン" (aikon: icon) analyzed by the natural sentence analyzer 102. Here, since "エ" (e) is removed, and "イ" (i) is inserted, distance calculation is performed, and the reading similarity is determined as distance 2.

Hence, processing of multiplying the value $P_1$ "止める (ga-case: φ, wo-case: 冷房, ni-case: φ)" by, for example, α=0.1 and outputting the result may be performed. Note that the value α may be a value that changes in accordance with the similarity.

In the above-described example of the first knowledge database 104, the semantic representation 305 is assumed to include one predicate and one argument. However, based on a synonym dictionary or the like, a plurality of words may be represented together for the representations of predicates and arguments having the same meaning.

For example, as the synonyms of "停止する" (teishi suru: switch off), "止める" (tomeru: switch off) and "ストップする" (sutoppu suru: switch off) can be considered. Hence, the first knowledge database 104 may store a plurality of synonyms together like "{停止する, 止める, ストップする, 停止, ストップ} (wo-case: エアコン)" as a semantic representation including a plurality of synonyms. This enables to uniquely execute the processing even if there are fluctuations in the natural sentence, such as "エアコンを停止して" (eakon wo teishi shite: please switch off air conditioner), "エアコン 停止" (eakon teishi: switch off air conditioner), "エアコンの 停止" (eakon no teishi: switch off air conditioner), and "エアコンの停止お願い" (eakon teishi no onegai: requesting to switch off air conditioner).

In addition, when analyzing an input natural sentence, a plurality of words may be prepared as semantic representations based on a synonym dictionary or the like. If a completely matching semantic representation cannot be found in the first knowledge database 104, the semantic representation may be replaced with a synonym, and the first knowledge database 104 may be searched for the replaced semantic representation again to quire the first value corresponding to the semantic representation from the first knowledge database 104.

Furthermore, when analyzing an input utterance, the semantic representation may be expanded to a plurality of words based on a superordinate/subordinate concept dictionary. If a completely matching semantic representation cannot be found in the first knowledge database 104, the spoken language understanding unit 106 may replace the semantic representation with a broader term and acquire the first value corresponding to the replaced semantic representation from the first knowledge database 104. For example, if an argument in a semantic representation is "冷房" (reibou: air conditioner), and a semantic representation including "冷房" as an argument does not exist in the first knowledge database 104, "冷房" may be replaced with a broader term "エアコン" (eakon: HVAC equipment), and a search may be performed to acquire the first value corresponding to a semantic representation including "エアコン" as an argument.

Note that as semantic representations in the first knowledge database 104, kana characters showing pronunciations may also be stored in addition to notations. If no corresponding data can be obtained by a search based on a notation, a value corresponding to a semantic representation whose argument or predicate has the highest kana character similarity may be acquired.

The natural sentence analyzer 102 may generate a semantic representation using not a synonym dictionary and a superordinate/subordinate concept dictionary but a concept class.

When a concept class is used as a semantic representation, in step S201 of FIG. 2, the natural sentence analyzer 102 acquires a concept class by performing concept class analysis processing (for example, semantic class analysis processing and named entity extraction processing) for the natural sentence in parallel to morphological analysis processing and dependency parsing processing. In step S202, the obtained dependency parsing result may be combined with the concept class to generate a set of a predicate and an argument. At this time, the concept class is added to the word serving as the argument as needed.

Note that not in step S201 but in step S202, the concept class analysis processing may be performed for the argument obtained by the process of step S202 to acquire a concept class, and the concept class may be added to the word serving as the argument as needed.

For example, using a concept class, a semantic representation "メールする (ni-case: ママ (mama: mother))" may be replaced with a representation "メールする (ni-case: [personal name])", and the replaced representation may be held as semantic representation in the first knowledge database 104 or used as the result of step S201.

Figure 6:
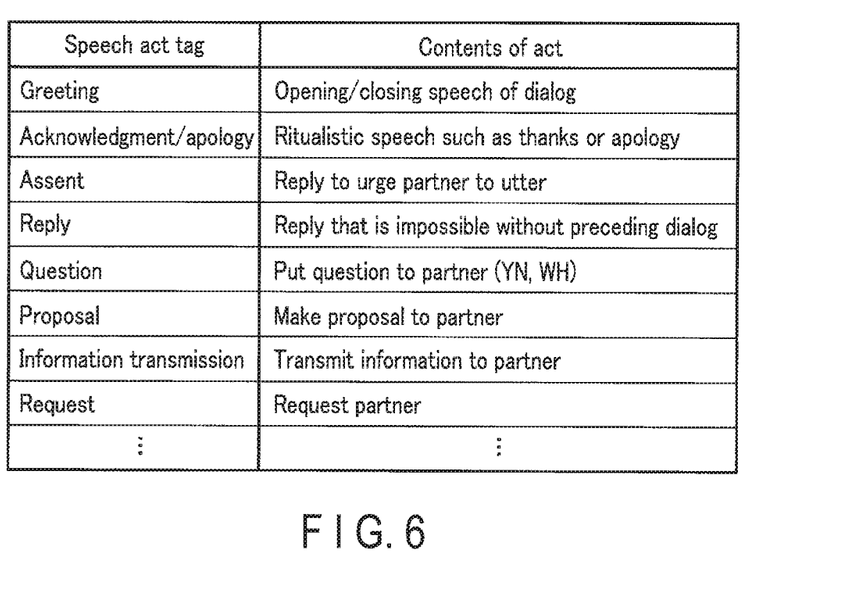
FIG. 6 is a view showing a table concerning speech acts included in semantic representations.

In addition, information about a speech act may be included as a semantic representation. FIG. 6 shows speech acts included in semantic representations.

FIG. 6 is a table that associates a speech act tag with the contents of a speech act. A speech act indicates not the semantic contents of an utterance but an attitude when the user makes an utterance. A speech act tag is a tag representing a speech act. Examples of the speech act tag are greeting, apology, and question. By referring to the speech act tag in processing at a subsequent stage, the intention of an utterance can be recognized more accurately.

The above-described situation information is assumed to be handed as a choice from two alternatives, that is, whether a certain situation has occurred or not. That is, in the example of FIG. 3C, a situation in which all of S1, S2, and S3 have occurred and a situation in which S1 and S3 have occurred, but S2 has not occurred are handled.

However, when estimating whether a certain situation has occurred, the possibility may be derived as a certain value such as a probability. To handle the situation information as a choice from two alternatives, a threshold is preferably set for the derived value. More preferably, the value is directly used.

Figure 7:
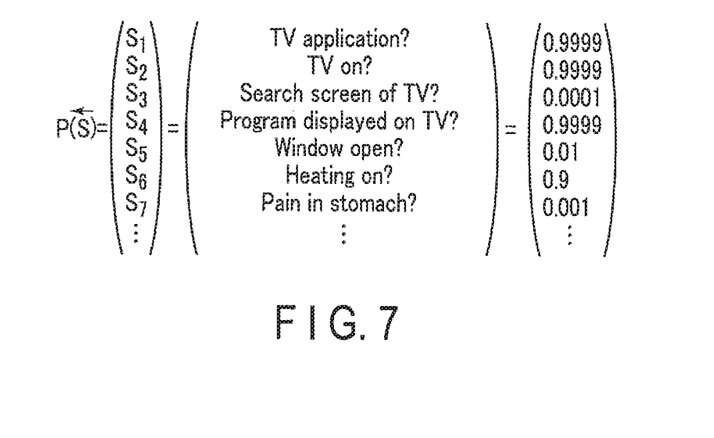
FIG. 7 is a view showing an example in which situation information is given in a vector format.

FIG. 7 shows an example in which situation information is given in a vector format. FIG. 7 shows a case in which each of various pieces of situation information $S_q$ is represented by a vector of a certainty (probability) representing the probability of the situation. In this vector, the elements need not add up to 1, and exclusive elements that add up to 0 may be included as the probability. As an element of the vector, an element obtained by combining the elements may be added.

If the situation information is represented by the vector format, the formula of the intention model can be rewritten as $$\mathrm{argmax}_{I_i} P_1(M_k \mid I_i, \overleftarrow{S_q}) \times P_2(I_i \mid \overleftarrow{S_q}) \approx \qquad (6)$$

$$\mathrm{argmax}_{I_i} \left\{ \sum_{S_{qj}=0}^{j=m} P_1(M_k \mid I_i, S_q) \times P_2(I_i \mid S_q) \right\}$$

According to the above-described first embodiment, the intention of a natural sentence is estimated using a value representing the degree of application of a semantic representation to intention information and situation information, thereby estimating an intention to an utterance and a situation that are difficult to directly prepare. It is therefore possible to recognize the intention of a user's free utterance and perform dialog processing by accurately estimating the intention of a natural sentence even in processing at a subsequent stage such as a speech interaction.

(Second Embodiment)

In the second embodiment, situation information acquired by a situation information acquisition unit is collected from a plurality of viewpoints.

Figure 8:
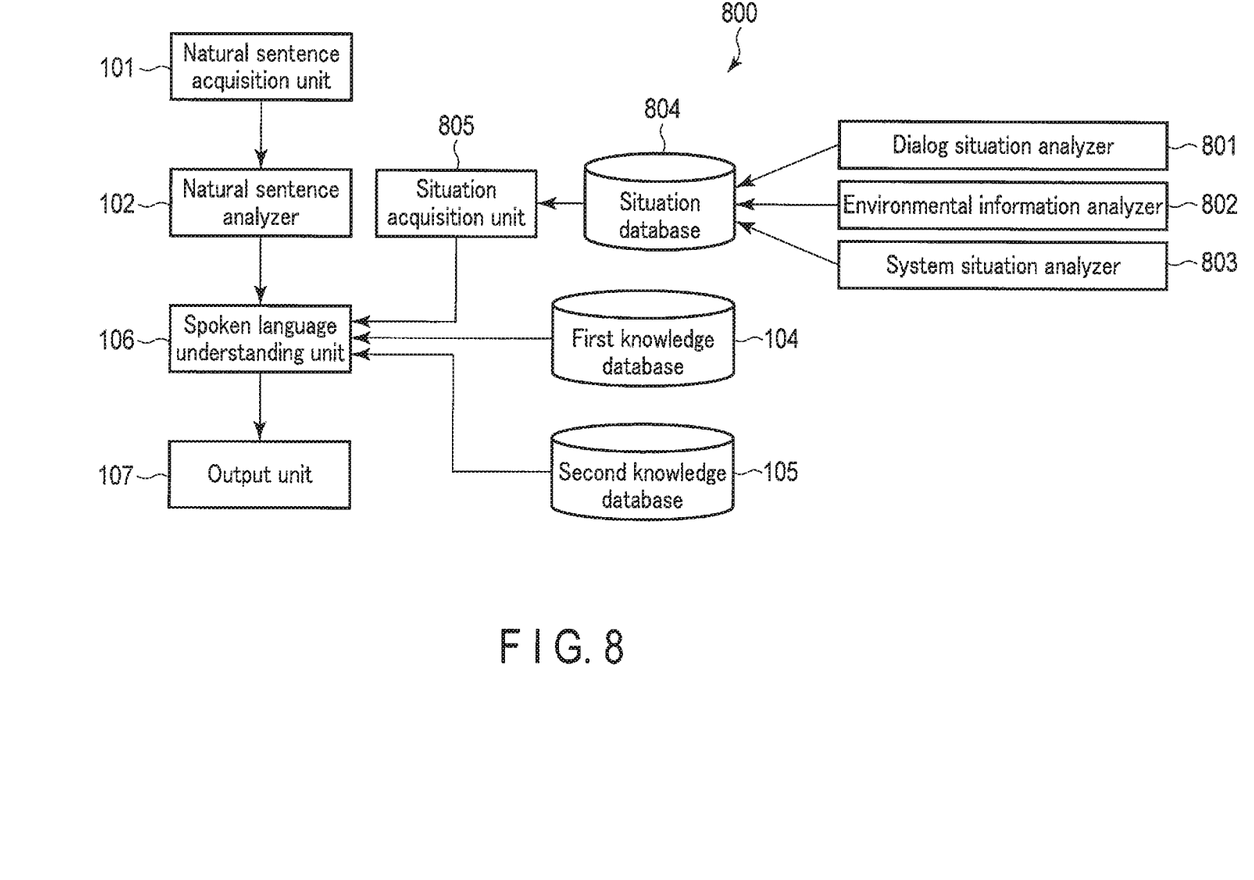
FIG. 8 is a block diagram showing a spoken language understanding apparatus according to the second embodiment.

A spoken language understanding apparatus according to the second embodiment will be described with reference to the block diagram of FIG. 8.

A spoken language understanding apparatus 800 according to the second embodiment includes a natural sentence acquisition unit 101, a natural sentence analyzer 102, a first knowledge database 104, a second knowledge database 105, a spoken language understanding unit 106, an output unit 107, a dialog situation analyzer 801 (also called a second analyzer), an environmental information analyzer 802 (also called a third analyzer), a system situation analyzer 803 (also called a fourth analyzer), a situation database 804, and a situation acquisition unit 805.

The natural sentence acquisition unit 101, the natural sentence analyzer 102, the first knowledge database 104, the second knowledge database 105, the spoken language understanding unit 106, and the output unit 107 perform the same processing as described above, and a description thereof will be omitted here.

The dialog situation analyzer 801 analyzes dialog history data of natural sentences input by the user and replies from the system to the natural sentences, thereby obtaining an analysis result. As the analysis result, for example, not only the use situation and the fact that has occurred, which can be known from the sentences in the dialog history, but also the context and the like are converted into the format of situation information. The dialog history data is acquired from, for example, an external dialog processing server.

The environmental information analyzer 802 analyzes a measurement result obtained by measuring the environment on the periphery by sensors. More specifically, the temperature, humidity, sound volume, speed, angle, weight, and the like are measured by sensors at a predetermined sampling interval, thereby obtaining an analysis result. Note that the analysis result obtained by the natural sentence acquisition unit 101 may be a value measured at the timing when the natural sentence acquisition unit 101 acquires a natural sentence.

The system situation analyzer 803 analyzes information about the system such as information displayed on the system used by the user, the current state of the system controlled, what kind of processing is executable by the system, and what kind of processing is assumed by the user to be executable, thereby obtaining an analysis result. The information about the system may be acquired from outside as needed or given to the system situation analyzer 803 in advance.

The situation database 804 receives the analysis results from the dialog situation analyzer 801, the environmental information analyzer 802, and the system situation analyzer 803 and stores them. The situation database 804 may store situation IDs shown in FIG. 3A, the numerical values of vectors shown in FIG. 7, and the like as analysis results.

The situation acquisition unit 805 acquires an analysis result to be considered as the current situation from the situation database 804.

Note that the analysis result of the environmental information analyzer 802 and the analysis result of the system situation analyzer 803 may be used for the analysis processing by the dialog situation analyzer 801.

According to the above-described second embodiment, more correct situation information can be acquired by referring the information stored in the situation database. It is therefore possible to more correctly perform spoken language understanding.

(Third Embodiment)

In the third embodiment, assume a case in which a user and a spoken language understanding apparatus perform a speech interaction.

Figure 9:
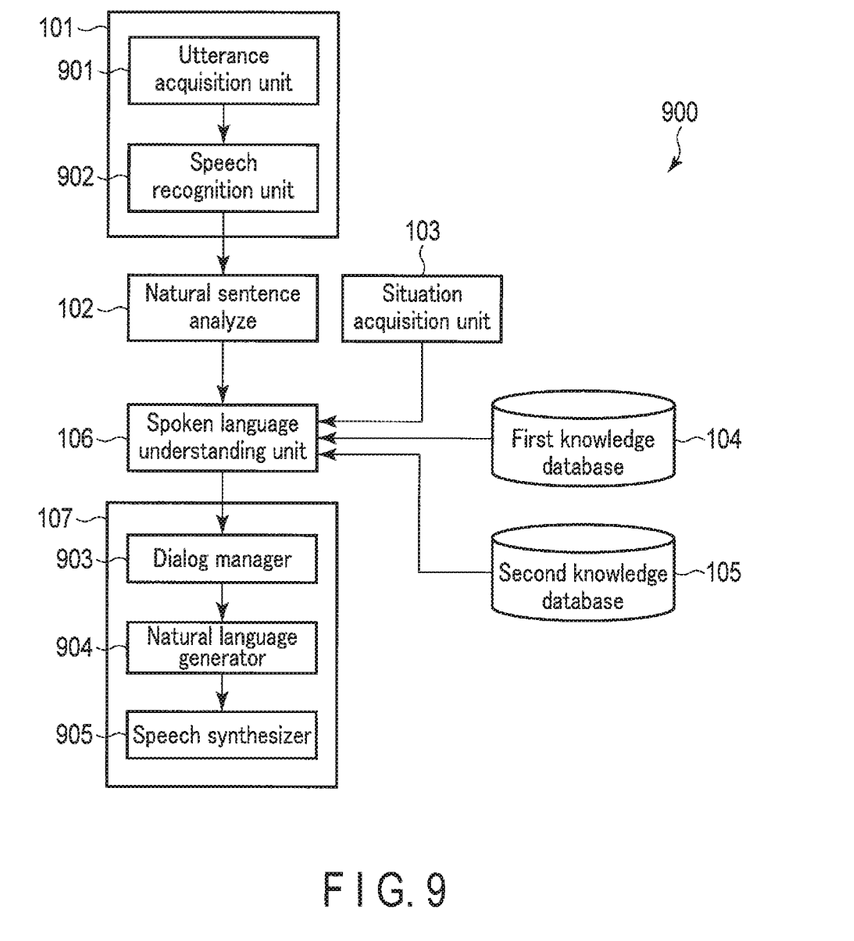
FIG. 9 is a block diagram showing a spoken language understanding apparatus according to the third embodiment.

A spoken language understanding apparatus according to the third embodiment will be described with reference to the block diagram of FIG. 9.

A spoken language understanding apparatus 900 according to the third embodiment is almost the same as in the first embodiment but is different in that a natural sentence acquisition unit 101 includes an utterance acquisition unit 901 (also called a third acquisition unit) and a speech recognition unit 902, and an output unit 107 includes a dialog manager 903, a natural language generator 904, and a speech synthesizer 905.

The utterance acquisition unit 901 acquires a user's utterance as a speech signal.

The speech recognition unit 902 receives the speech signal from the utterance acquisition unit 901, performs speech recognition processing for the speech signal, and generates a natural sentence as a speech recognition result.

The dialog manager 903 receives an estimated value and estimated intention information from a spoken language understanding unit 106, and determines the next processing and reply contents of the dialog system based on the estimated value and the estimated intention information. Note that dialog control processing in a general dialog system suffices as the processing of the dialog manager 903, and a detailed description thereof will be omitted here.

The natural language generator 904 receives the processing and reply contents of the dialog system from the dialog manager 903, and generates a reply sentence as a natural sentence based on the reply contents.

The speech synthesizer 905 receives the reply sentence from the natural language generator 904, performs speech synthesis processing for the reply sentence, and outputs the synthesized speech of the reply sentence.

The spoken language understanding apparatus 900 according to the third embodiment performs the same operation as that of the spoken language understanding apparatus 100 according to the first embodiment and a description thereof will be omitted here.

According to the above-described third embodiment, even if the user makes a free utterance, intention information can correctly be generated by the spoken language understanding unit. Hence, smoother dialog processing can be performed by the dialog system and speech.

An instruction shown in the processing procedures of the above-described embodiments can be executed based on a program that is software. When a general-purpose computer system stores the program in advance and loads it, the same effects as those of the above-described spoken language understanding apparatuses can be obtained. Each instruction described in the above embodiments is recorded in a magnetic disk (for example, flexible disk or hard disk), an optical disk (for example, CD-ROM, CD-R, CD-RW, DVD-ROM, DVD±R, DVD±RW, or Blu-ray® Disc), a semiconductor memory, or a similar recording medium as a program executable by a computer. Any storage format is employable as long as the recording medium is readable by a computer or an embedded system. When the computer loads the program from the recording medium, and causes the CPU to execute the instruction described in the program based on the program, the same operation as the spoken language understanding apparatuses according to the above-described embodiments can be implemented. When the computer acquires or loads the program, it may be acquired or loaded via a network, as a matter of course.

An OS (Operating System) operating on the computer or MW (middleware) such as database management software or a network may execute part of each processing for implementing the embodiments based on the instruction of the program installed from the recording medium to the computer or embedded system.

The recording medium according to the embodiments is not limited to a medium independent of the computer or embedded system, and also includes a recording medium that stores or temporarily stores the program transmitted by a LAN or the Internet and downloaded.

The number of recording media is not limited to one. The recording medium according to the embodiments also incorporates a case in which the processing of the embodiments is executed from a plurality of media, and the media can have any arrangement.

Note that the computer or embedded system according to the embodiments is configured to execute each processing of the embodiments based on the program stored in the recording medium, and can be either a single device formed from a personal computer or microcomputer or a system including a plurality of devices connected via a network.

The computer according to the embodiments is not limited to a personal computer, and also includes an arithmetic processing device or microcomputer included in an information processing device. Computer is a general term for devices and apparatuses capable of implementing the functions of the embodiments by the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spoken language understanding apparatus comprising processing circuitry coupled to a memory, the processing circuitry configured to:
   store first situation information about a situation assumed in advance, a first semantic representation representing a meaning of a sentence assumed as an input from a user, intention information representing an intention to be estimated, and a first value representing a degree of application of the first semantic representation to the first situation information and the intention information in association with each other;
   acquire a natural sentence;
   acquire second situation information about a situation when acquiring the natural sentence;
   analyze the natural sentence and generate a second semantic representation representing a meaning of the natural sentence; and
   obtain an estimated value based on the first value associated with the first situation information and the first semantic representation, the estimated value corresponding to the second situation information and the second semantic representation.

2. The apparatus according to claim 1, wherein the processing circuitry is configured to acquire intention information associated with the estimated value as estimated intention information.

3. The apparatus according to claim 2, wherein the processing circuitry is further configured to:
   determine reply contents to the user using the estimated value and the estimated intention information; and
   generate a reply sentence based on the reply contents.

4. The apparatus according to claim 3, wherein the processing circuitry is further configured to perform speech synthesis for the reply sentence and generate synthesized speech.

5. The apparatus according to claim 1, wherein the processing circuitry is further configured to:
   acquire an utterance from the user; and
   perform speech recognition of the utterance and generate the natural sentence.

6. The apparatus according to claim 1, wherein the processing circuitry is further configured to store the first situation information, the intention information, and a second value representing a degree of application of the intention information to the first situation information in association with each other.

7. The apparatus according to claim 6, wherein the processing circuitry is configured to and generate a first model for each intention information item using the second situation information and the second semantic representation, look up the second storage unit and generate a second model for each intention information item using the second situation information, and calculate the estimated value using the first model and the second model, the intention information including intention information items.

8. The apparatus according to claim 1, wherein the processing circuitry is further configured to:
analyze a dialog history with the user;
measure and analyze a situation around the user; and
analyze a function and a state of a system used by the user,
wherein the processing circuitry acquires an analysis result of at least one of the second analyzer, the third analyzer, and the fourth analyzer as the second situation information.

9. The apparatus according to claim 1, wherein the first semantic representation and the second semantic representation are generated based on one of a pair of a noun and a verb and a predicate argument structure.

10. The apparatus according to claim 1, wherein the first semantic representation and the second semantic representation include information about a speech act that is an attitude when the user makes the utterance.

11. The apparatus according to claim 1, wherein the first semantic representation and the second semantic representation include supplementary information to a meaning of a word.

12. The apparatus according to claim 1, wherein the second situation information is represented by a vector of a likelihood representing a probability of each of a plurality of situations.

13. The apparatus according to claim 1, wherein the processing circuitry is configured to generate a plurality of second semantic representations.

14. The apparatus according to claim 1, wherein the processing circuitry is configured to store the first semantic representation using one of a synonym dictionary and a concept class that is a set of identical concepts.

15. The apparatus according to claim 14, wherein the processing circuitry is configured to generate the second semantic representation including the concept class.

16. A spoken language understanding method comprising:
storing in a first storage unit first situation information about a situation assumed in advance, a first semantic representation representing a meaning of a sentence assumed as an input from a user, intention information representing an intention to be estimated, and a first value representing a degree of application of the first semantic representation to the first situation information and the intention information in association with each other;
acquiring a natural sentence;
acquiring second situation information about a situation when acquiring the natural sentence;
analyzing the natural sentence and generating a second semantic representation representing a meaning of the natural sentence; and
obtaining, from the first storage unit, an estimated value based on the first value associated with the first situation information and the first semantic representation corresponding to the second situation information and the second semantic representation.

17. A non-transitory computer readable medium storing a computer program which is executed by a computer to provide the steps of:
storing in a first storage unit first situation information about a situation assumed in advance, a first semantic representation representing a meaning of a sentence assumed as an input from a user, intention information representing an intention to be estimated, and a first value representing a degree of application of the first semantic representation to the first situation information and the intention information in association with each other;
acquiring a natural sentence;
acquiring second situation information about a situation when acquiring the natural sentence;
analyzing the natural sentence and generating a second semantic representation representing a meaning of the natural sentence; and
obtaining, from the first storage unit, an estimated value based on the first value associated with the first situation information and the first semantic representation corresponding to the second situation information and the second semantic representation.

18. A spoken language understanding apparatus comprising processing circuitry coupled to a memory, the processing circuitry configured to:
store a first situation ID corresponding to first situation information about a situation assumed in advance, a first semantic representation representing a meaning of a sentence assumed as an input from a user, an intention ID corresponding to intention information representing an intention to be estimated, and a first value of conditional probability of the first semantic representation to the first situation ID and the intention ID;
acquire a natural sentence;
acquire a second situation ID about a situation when acquiring the natural sentence;
analyze the natural sentence and generate a second semantic representation representing a meaning of the natural sentence; and
obtain an estimated value based on the first value associated with the first situation ID and the first semantic representation, the estimated value corresponding to the second situation ID and the second semantic representation.

* * * * *